No. 864,868. PATENTED SEPT. 3, 1907.
E. C. SMITH.
SIDE DELIVERY RAKE.
APPLICATION FILED SEPT. 23, 1905.

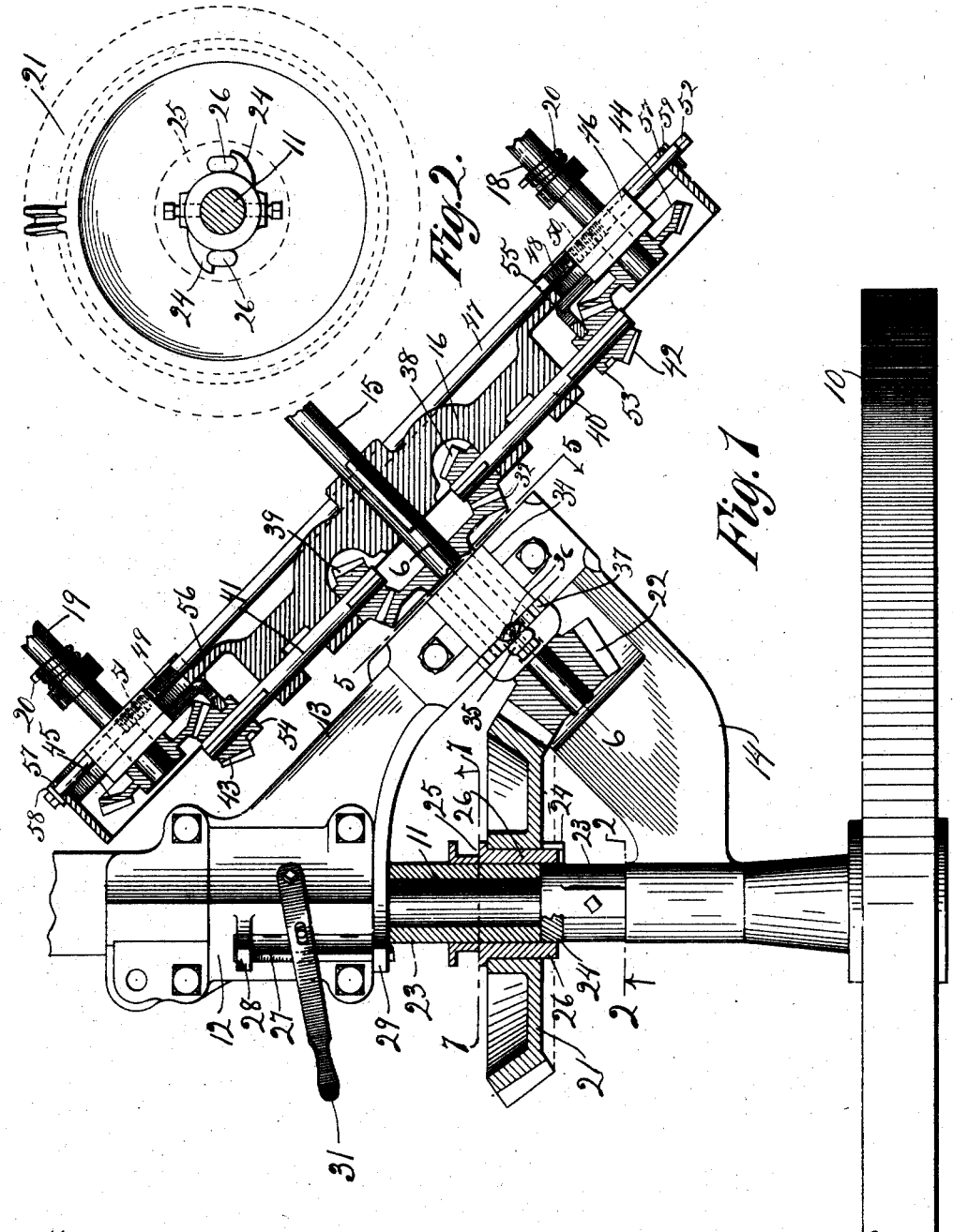

2 SHEETS—SHEET 2.

Witnesses:
W. H. Cotton.
Charles B. Gillson.

Inventor:
Ernest C. Smith,
By Louis R. Gillson
Attys.

UNITED STATES PATENT OFFICE.

ERNEST C. SMITH, OF HINCKLEY, ILLINOIS.

SIDE-DELIVERY RAKE.

No. 864,868.  Specification of Letters Patent.  Patented Sept. 3, 1907.

Application filed September 23, 1905. Serial No. 279,833.

*To all whom it may concern:*

Be it known that I, ERNEST C. SMITH, a citizen of the United States, and a resident of Hinckley, county of DeKalb, and State of Illinois, have invented certain new and useful Improvements in Side-Delivery Rakes, of which the following is a specification and which are illustrated in the accompanying drawings, forming a part thereof.

The invention relates to that style of side delivery rakes in which there is a wheel-supported frame carrying a diagonally-disposed rotatable reel, provided with rake-heads arranged to maintain a constant angular position upon their axes, means being provided for rotating the reel from the traction of the carrying wheels, and means being provided for maintaining the position of the rake-heads while the reel rotates.

The invention relates to the reel-driving and rake-controlling mechanism; and it consists of the parts and arrangement of parts hereinafter described and pointed out as novel.

The invention is illustrated in the acompanying drawings, in which—

Figure 3:
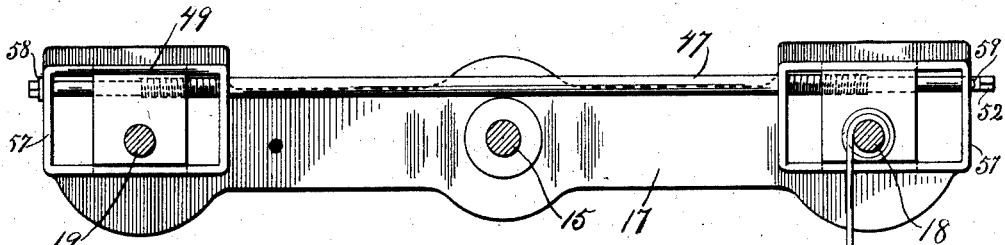
Figure 5:
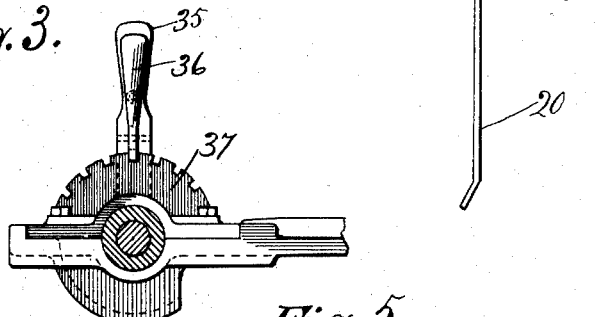
Figure 6:
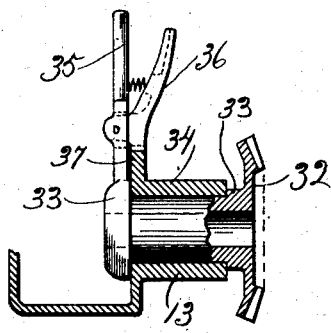
Figure 4:
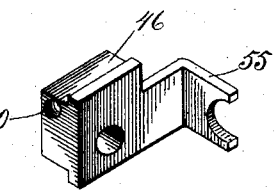
Figure 7:
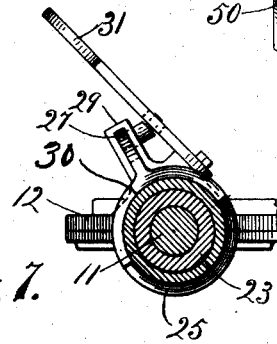

Figure 1 is a detail plan, partly in section, of the rake; Fig. 2 is a detail section, partly in elevation, taken on the line 2—2 of Fig. 1; Fig. 3 is a transverse section through the reel, showing the cross-bar at its rearward end; Fig. 4 is a perspective of one of the journal blocks for the rake-heads; Figs. 5, 6 and 7 are sectional details taken, respectively, on the lines 5—5, 6—6 and 7—7 of Fig. 1.

The type of machine to which the invention relates is so well known that I have not deemed it necessary to show more than details in the drawings. One of the carrying wheels is shown at 10 and is fixed upon an axial shaft 11, upon which there is mounted a bracket 12 having a rearwardly and obliquely extending arm 13, braced to the outer end of the axial shaft by the arm 14. The reel shaft 15 is journaled in the bracket-arm 13, and carries a pair of cross-bars 16, 17, upon the outer ends of which are mounted the shafts 18, 19, of the rake-heads, which carry teeth 20, the length of which is less than the distance between the shafts 18, 19, and the shaft 15. A bevel gear 21, rotating about and driven from the shaft 11, meshes with a bevel gear 22 fixed upon the shaft 15. The gear 21 is mounted loosely on a sleeve 23, mounted upon and fixed to the shaft 11 and provided with radial lugs 24. A clutch member 25 is mounted loosely and slides upon the sleeve 23, and has a pair of fingers 26 extending through axially disposed apertures in the hub of the gear 21 and into the path of the lugs 24.

A shipper bar 27, mounted to slide through lugs 28, 29, on the bracket 12, carries a yoke 30, engaging a peripheral channel in the clutch member 25, the shipper bar being controlled by a hand lever 31, pivoted to the bracket 12. This clutch mechanism enables the operator, by the use of the lever 31, to engage the gear 21 with and disengage it from the shaft 11 by advancing or retracting the clutch member 25. A normally stationary but adjustable bevel gear 32 is mounted concentrically with the shaft 15 adjacent the rearward face of the bracket-arm 13, its hub 33 projecting through the journal box 34 mounted thereon, and carrying at its forward end a hand lever 35, provided with a spring pawl 36, adapted to engage a notched quadrant 37 fixed to the box 34.

The gear 32 is in mesh with a pair of beveled pinions 38, 39, each of which is mounted upon a shaft 40, 41, radially disposed as to the shaft 15 and journaled in the cross-bar 16. At the outer end of each of the shafts 40, 41, is mounted a bevel gear 42, 43, each of which meshes with a bevel gear 44, 45, fixed, respectively, upon the shafts 18, 19 of the rake-heads. The several gears are so proportioned relatively that each rake-head makes a complete revolution as to the reel during each revolution of the latter, thereby maintaining their exact angular position upon their axes. By means of the hand lever 35 the bevel gear 32 may be adjusted about its axis, such adjustment changing the pitch of the rake-heads and adapting them to the exigencies of the service required.

It sometimes becomes desirable to vertically adjust the rake heads so that they may work closer to or farther from the ground. This is accomplished by moving them radially upon the cross-bars 16, 17. To permit of this adjustment the shafts of the rake-heads are journaled in boxes 46, mounted to slide longitudinally upon the cross-bars 16, 17, and controlled by a rod 47, having right and left screw-threads 48, 49, for engaging threaded apertures 50, 51, formed within the boxes 46 at the opposite ends of the cross-bars. The ends of the rods 47 are squared, as shown at 52, for the engagement of a wrench. By turning these rods the journal boxes, and with them the rake heads, are moved in and out upon the cross-bars 16, 17. The rod 47 is anchored against longitudinal movement by any simple means; as shown shoulders 57 are formed on the cross-bars 16, 17, and are apertured to receive the rods which carry at one end a washer 58 and at the opposite end a cotter pin 59 bearing against the shoulders to prevent end movement. The gears 42, 43, are splined upon their shafts 40, 41, and their hubs 53, 54, are annularly grooved for the engagement of a yoke-arm 55, 56, projecting from the adjacent journal box 46, thereby providing means for shifting these gears as the rake-heads are shifted.

I claim as my invention—

1. In a rake, in combination, a rotatable reel, and radially adjustable rake-heads carried by the reel.

2. In a rake, in combination, a rotatable reel having cross-arms, rotatable rake-heads journaled in boxes longitudinally slidable on the cross-arms, and means for simultaneously and uniformly sliding the boxes at opposite ends of the arms.

3. In a rake, in combination, a rotatable reel having cross-arms, rotatable rake-heads carried by the cross-arms and being radially adjustable thereon, gearing carried by the cross-arms for effecting the rotation of the rake-heads and being adjustable therewith.

4. In a rake, in combination, a rotatable reel having cross-arms, a stationary gear concentric with the shaft of the reel, rake-heads journaled in adjustable boxes carried by the cross-arms, shafts carried by the cross-arms, a gear on the inner end of each of such last-named shafts and meshing with the stationary gear, a gear slidingly mounted on the outer end of each of said shafts and engaging a gear on the shaft of the adjacent rake-head, and means for simultaneously shifting the sliding gears and the rake-heads.

ERNEST C. SMITH.

Witnesses:
 H. H. DEWEY,
 C. C. FLORY.